US008342937B2

(12) United States Patent
Lind

(10) Patent No.: US 8,342,937 B2
(45) **Date of Patent: *Jan. 1, 2013**

(54) MULTI-STATION GAMING SYSTEM AND METHOD

(75) Inventor: Clifton Lind, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 1365 days.

This patent is subject to a terminal disclaimer.

(21) Appl. No.: 11/868,840

(22) Filed: Oct. 8, 2007

(65) Prior Publication Data

US 2008/0026837 A1 Jan. 31, 2008

Related U.S. Application Data

(63) Continuation of application No. 10/985,375, filed on Nov. 10, 2004, now Pat. No. 7,278,918.

(51) Int. Cl.
*A63F 13/00* (2006.01)

(52) U.S. Cl. ................ 463/20; 463/16; 463/25; 463/29; 463/42

(58) Field of Classification Search .................... 463/25, 463/40–42, 1, 6, 16–20, 32–33
See application file for complete search history.

(56) References Cited

U.S. PATENT DOCUMENTS

| | | | | |
|---|---|---|---|---|
| 6,758,749 | B2 | 7/2004 | Krintzman | |
| 6,790,141 | B2 | 9/2004 | Muir | |
| 7,338,376 | B2 * | 3/2008 | Eck et al. | 463/42 |
| 7,892,097 | B2 * | 2/2011 | Muir et al. | 463/42 |
| 2002/0132666 | A1 | 9/2002 | Lind et al. | |

* cited by examiner

*Primary Examiner* — Ronald Laneau
*Assistant Examiner* — Ross Williams
(74) *Attorney, Agent, or Firm* — Russell D. Culbertson, Esq.; Nathan H. Calvert, Esq.; JP Cody

(57) ABSTRACT

Gaming methods, apparatus, and program products prompt players to move between different gaming machines or player stations included in a gaming system. One preferred method includes receiving a player input at a first player station in a network gaming system. Upon receiving the player input at the first player station, a station changing prompt is produced at the first player station. A multi-station game result for the player is then awarded to the player after the player makes some input at a second player station in the system.

20 Claims, 3 Drawing Sheets

MULTI-STATION GAMING SYSTEM AND METHOD

CROSS-REFERENCE TO RELATED APPLICATION

This application is a continuation of U.S. patent application Ser. No. 10/985,375, filed Nov. 10, 2004, entitled "Multi-Station Gaming System and Method," now U.S. Pat. No. 7,278,918. The Applicant claims the benefit of this prior application under 35 U.S.C. §120. The entire content of this prior application is incorporated herein by this reference.

TECHNICAL FIELD OF THE INVENTION

This invention relates to electronic gaming systems. More particularly, the invention is directed to apparatus, methods, and program products for games in which a player may be given an opportunity to interact with more than one player station during a game.

BACKGROUND OF THE INVENTION

Gaming machines such as mechanical slot machines and even early video slot machines and video poker machines were stand alone gaming machines in which a result for a game play was determined at the gaming machine itself in some fashion. Commonly, the gaming machine produced some random result in response to a game play request at the gaming machine. This random result was mapped to some prize that would then be awarded to the player. Many mechanical and video slot machines and other gaming machines still produce or determine the result of a game play at the gaming machine itself.

More recent gaming systems have connected the various individual gaming machines in a network communications arrangement for various purposes. The network communications in modern gaming systems have been used for accounting and player tracking purposes, to implement progressive games, and for facilitating centralized game result determination, for example.

One problem with both the prior stand alone gaming machines and networked gaming machines is that it is difficult to provide the player with a sense that their actions or inputs have any influence on their results. Also, player interaction in games offered through gaming machines has historically been limited. This lack of control and player interaction may ultimately make games offered through gaming machines unattractive to some players. Thus, gaming machine and gaming system providers have struggled to find new ways to capture player interest, and there is stiff competition between providers to offer gaming machines and systems that will continually attract players.

SUMMARY OF THE INVENTION

The present invention enhances player participation and interaction in a gaming system by implementing games that require player interaction at multiple player stations (also referred to herein as "gaming machines" and "electronic player stations"). The invention encompasses gaming methods that increase player interest and participation, as well as apparatus and program products for implementing those methods.

One method according to principles of the present invention includes initiating a course of play in a single-station game at a first player station in a gaming system in response to a single-station game selection input for the first player station. During the course of play in the single-station game at the first player station a station changing prompt is produced at the first player station which may prompt the player to move to a second player station in the gaming system. After producing the station changing prompt at the first player station, the method includes receiving a second player input or prompting player input at the second or target player station and awarding or producing a multi-station game result for the player. This multi-station game result is distinct from any result that may be obtained through a game conducted entirely through the second player station, although the multi-station game result may affect or interact with a result obtained through a game conducted entirely at the second player station. Generally, as used in this disclosure and the accompanying claims, a multi-station game result comprises that result or benefit that is awarded or granted to a player, or identified or produced for a player, for interacting with the gaming system through a first player station and at least one other player station for a multi-station game. The second or subsequent player station employed in a multi-station game according to the present invention may be referred to as a target player station.

Games according to the present invention that provide a multi-station game result after player interaction at both a first and at least one additional player station are referred to in this disclosure as multi-station games. Games that may be completed to produce a result based on player interaction with a single player station, and are unrelated to any action or activity by the game player at more than one player station, are referred to in this disclosure and accompanying claims as single-station games. Further details on multi-station games according to the invention and various types of interaction between multi-station and single-station games will be described below in the description of preferred embodiments.

Numerous variations on the basic multi-station gaming method are encompassed within the scope of the present invention. For example, the step of producing the station changing prompt at the first player station may be performed in response to a particular player input at the first player station in the course of play in the single-station game or in response to some result or occurrence in the single-station game. Also, a multi-station game according to the invention may award a multi-station game result to the player in response to the prompted input or in response to some other player input or event at the second player station. These and other variations and methods within the scope of the present invention will be described below with reference to the drawings.

A preferred gaming system according to principles of the present invention may include a first player station and a second player station, and preferably numerous player stations. The system also includes a multi-station game controller for directing the first player station to produce a station changing prompt during the course of play in a single-station game at the first player station. The multi-station game controller also preferably monitors for a prompted player input or second player input at the second player station, and awards a multi-station game result after the prompted player input/second player input at the second player station.

The present invention also includes a program product stored on at least one computer readable medium. The program product includes a set of machine-readable instructions that when executed are configured to carry out the methods disclosed herein.

These and other advantages and features of the invention will be apparent from the following description of preferred embodiments, considered along with the accompanying drawings.

DESCRIPTION OF PREFERRED EMBODIMENTS

Figure 1:
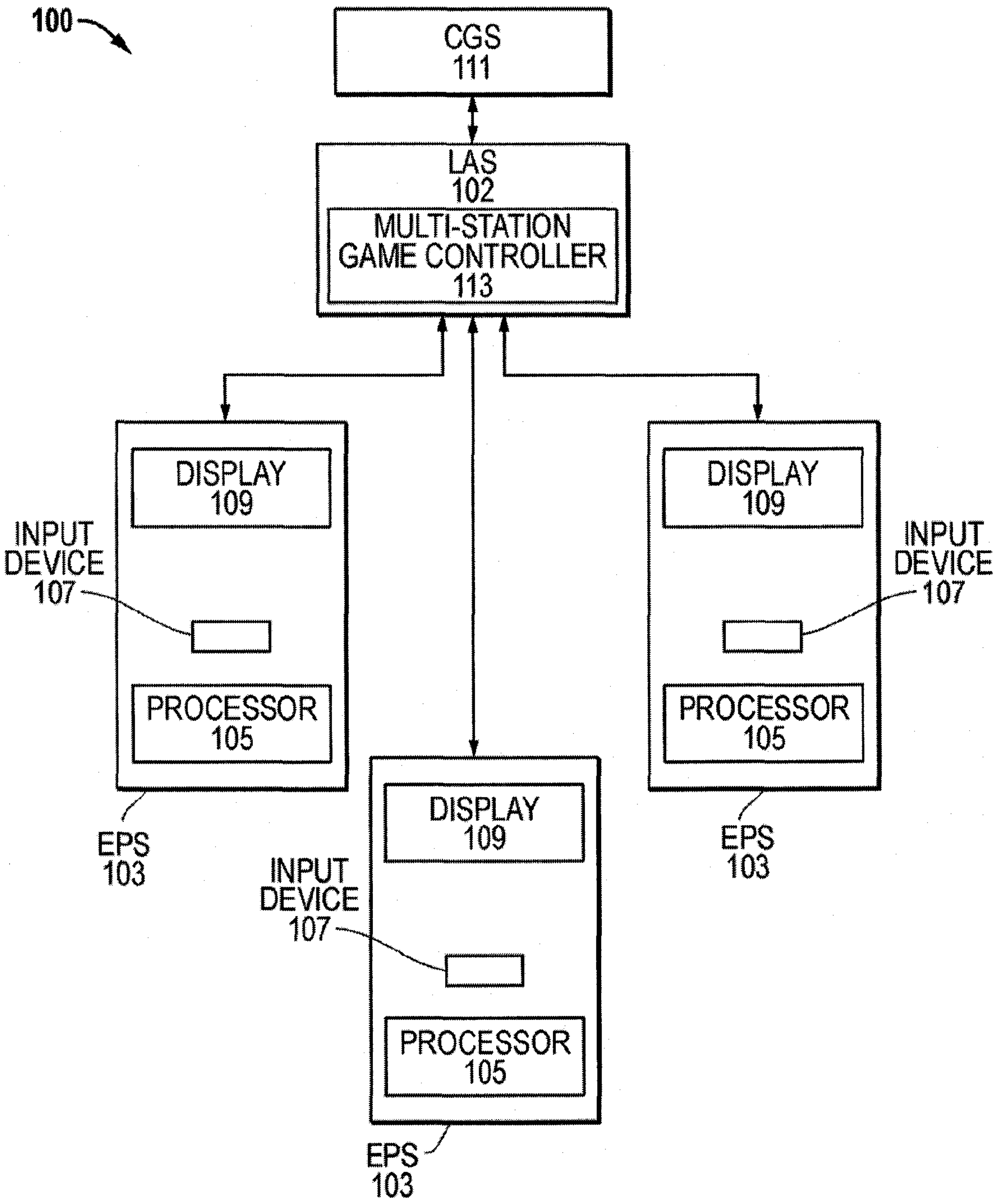
FIG. 1 is a high level diagrammatic representation of a gaming system embodying the principles of the present invention.

FIG. 1 shows a gaming system 100 that enables a player to take part in either a single-station game where the player remains at a single player station for at least one entire game, or a multi-station game where the player may be prompted to move from one player station to another player station in the gaming system. A gaming site included in gaming system 100 may include a local area server (LAS) 102 and a number of electronic player stations (EPSs) 103. Although only a single gaming site is shown for purposes of example in FIG. 1, it will be appreciated that gaming system 100 may include a number of separate gaming facilities or casinos each including a respective LAS 102 and preferably numerous EPSs 103. Gaming system 100 also may include a central processing system shown as central game server (CGS) 111.

In general, an EPS 103 may include a processor 105, an input device 107, and a display 109. The EPSs 103 included in system 100 may comprise computer systems having non-volatile memory, volatile memory, a user interface arrangement, and communications interface, all connected to a system bus (not shown). The volatile and nonvolatile memory of the EPS 103 may store computer program code that may be executed by the processor 105 to cause the processor to perform or direct the various functions provided by the EPS.

It will be appreciated that FIG. 1 provides only a very diagrammatic representation of each EPS 103 and does not show many elements that may be included in such a player station that may be used in a system according to the present invention. In particular, it will be appreciated that an EPS 103 may have a separate graphics processor controlled through processor 105 to cause various graphics to be displayed on display 109. It will also be appreciated that an EPS 103 may include more than a single display. Thus, display 109 may comprise multiple separate display devices such as CRTs, LCDs, plasma displays, or any other suitable types or combination of displays. Also, one or more touch screen controllers may be associated with display 109. In addition, each EPS 103 will commonly include a sound system for providing high quality audio output at the EPS and a visual alerting device such as a light mounted at the top of the EPS.

Each EPS 103 may also include a device for receiving value and issuing value in the course of play. This device may accept currency, vouchers, or tokens, for example, and also output currency, vouchers, or tokens. Of course, a separate device may be used to receive and issue value for games played according to the present invention. Alternatively or in addition to a value in/out device, EPSs 103 may obtain player account information and account for wagers and winnings in the manner set out in U.S. publication No. 2002-0132666, filed Jan. 10, 2002 and entitled "Distributed Account Based Gaming System," the entire content of which is hereby incorporated herein by this reference. An EPS 103 in system 100 may include any suitable card reader for reading information from a player account or player club card and/or a suitable interface such as an actual keypad or touchscreen keypad that allows a player to input player account or player identifying information.

Player account and player identification databases that may be used in system 100 may be maintained at any suitable point in the system. In preferred implementations of system 100, the respective LAS 102 associated with a given gaming site or casino maintains accounting and player databases for players using EPSs 103 at that particular gaming site or casino. However, a more centralized component, such as CGS 111 may also participate in maintaining player account and player activity information.

It should further be noted that the EPSs 103 need not be identical throughout system 100. Rather, there may be wide variations in the various components included in each respective EPS 103. The additional details of a respective EPS 103 such as a sound system, visual alerting device, card reader, or value in/out devices are unnecessary for a description of the present invention, and thus, are not shown in the figures.

The LAS 102 shown in FIG. 1 may comprise at least one computer system having one or more processors, nonvolatile memory, volatile memory, a user interface arrangement, and communications interface, all connected to a system bus (not shown). The volatile and nonvolatile memory may store computer program code that may be executed by the processor(s) to cause the processor(s) to perform or direct the various functions provided by LAS 102.

LAS 102 may communicate with respective EPSs 103 via a communications interface across a network. The communications interface between LAS 102 and each EPS 103 preferably allows communications for a number of different purposes, including purposes associated with multi-station games according to the present invention. For example, communications between LAS 102 and each EPS 103 preferably allow the LAS or associated systems to collect status information from each EPS, such as whether an EPS 103 is idle and for how long it has been idle, historical information concerning the amount of play that the EPS has seen in the system 100 over time, information on the game or games available at an EPS, information on graphics being displayed at an EPS, and information identifying a particular player at a respective EPS 103. The LAS 102 may store this status and other information locally or at a remote system for access as needed. Of course, gaming system 100 is implemented such that LAS 102 may address and send EPS-specific information to each EPS 103, and such that the LAS may distinguish between communications from the respective EPSs 103 and determine which communication is from which EPS.

LAS 102 also preferably implements a multi-station game controller 113 for controlling the multi-station games that system 100 may support. The multi-station game controller 113 may include program code for a game conducting controller and an evaluation controller. The game conducting controller 113 may include program code at the LAS 102 that cooperates with additional program code from at least two EPSs 103 for conducting a multi-station game. The evaluation controller may be used for producing, identifying, and/or awarding the result in a multi-station game. As will be discussed further below, a multi-station game result according to the invention may be based on player actions at the EPSs 103 involved in a multi-station game. These player actions include both simple actions, such as the player identifying themselves, as well as more complicated actions. Examples of more complicated player actions include inputting an answer to a trivia question at an EPS 103, or making a certain input or combination of inputs in the course of a multi-station game.

In a preferred operation of gaming system 100, a player at any EPS 103 in the system may be prompted or given the option to move to a different EPS 103 under the direction of the multi-station game controller 113 that may be implemented at an LAS 102. The LAS 102 may direct a first EPS 103 to produce a station changing prompt and monitor for a prompted player input at a second EPS 103. When a player at the first EPS 103 receives the station changing prompt, the player preferably has the option of following the prompt or continuing play at that first EPS. If the player follows the prompt, the player may become the multi-station player and move to a second or target EPS 103. When the multi-station player arrives at the second EPS 103, the multi-station player may be prompted for an input to identify that the multi-station player has arrived. The multi-station player input may be some action such as a login that allows the multi-station game controller 113 to recognize that the multi-station player has arrived at the second EPS 103. In some embodiments, an EPS 103 may include optical or video scanners that may recognize the multi-station player by matching with known images and without a specific input from the multi-station player to identify themselves. Regardless of how the multi-station player is identified at the second EPS 103, the multi-station game controller 113 ultimately awards the multi-station player with a multi-station game result. This award is preferably made through the second/target EPS 103.

CGS 111 may serve any number of functions in gaming system 100. For example, CGS 111 may implement a bingo gaming engine for conducting bingo games between players participating at different casinos or gaming facilities in system 100. CGS 111 may also be used to manufacture sets of electronic tickets for lottery-type games available through the various EPSs 103 in system 100. Otherwise, CGS 111 may be used for system wide monitoring, data collection, and control. Some forms of the present invention may implement the multi-station game controller 113 at CGS 111 rather than the particular LAS 102 associated with the respective casino or gaming facility.

It will be appreciated that, in addition to multi-station games, the CGS 111 or the LAS 102 may communicate directly with an EPS 103 to control or support the play of single-station games at the various EPSs. These single-station games may be games such as video lottery, bingo, video poker, reel-type games (slot machines), or any other type of game that may be implemented at an EPS 103. The results from the various single-station games may be determined or identified at the EPS 103 itself, at some remote device such as LAS 102 or CGS 111, or through a combination of processes performed at the respective EPS 103 and other system components.

It should also be noted that multi-station games according to the invention are integrated with single-station games. For example, a multi-station game may require the play of a single-station game at one EPS 103 and the play of a separate single-station game at another EPS. Two single-station games together may amount to or represent a multi-station game according to the present invention. In preferred forms of the invention a player first initiates a course of play in a single-station game at a first player station in response to a single-station game selection input at the first EPS 103. This single-station game selection input is taken as, or comprises, a player's selection to play a particular single-station game at the particular EPS 103. Such a single-station game selection input may comprise a player login at the EPS 103, a bet or play input at the EPS, or any other player input that represents a player's selection to enter a course of game play in the particular single-station game at the EPS. In some forms of the invention, such as where an EPS 103 has the capability of recognizing a player at the player station without an active input by the player, the single-station game selection input may be passive, requiring only that the player move into position to play a game at the EPS 103. A single-station game for which a single-station game selection input is made may comprise a video poker or other card game, a video lottery game, a video bingo game, video keno game, or a reel-type game (mechanical or video), for example, or some other type of game.

In one embodiment, system 100 may be programmed to encourage players to move to a particular location in a casino for some reason. For example, multi-station games may be used to encourage players to move to new EPSs 103 that have recently become available in system 100. Since the players may be unfamiliar with the new EPSs 103, the players may need such encouragement in order to try the new machines. In other embodiments, system 100 may be programmed to determine or predict a player's interest in an EPS 103 providing a particular type of presentation or game, and then employ a multi-station game to encourage a player to try the EPS predicted to be of interest to the player. Information used to predict a player's interest in a given EPS 103 offering a given type of game or presentation may be retrieved by direct questioning of the player while a player account is being set up, by monitoring a player's actions at different EPSs 103 to identify certain player traits or interests, or by some other method. In another embodiment, players may be prompted to move from a first EPS 103 to a second EPS for a multi-station game because system 100 indicates the second EPS has been idle for a predetermined length of time. The player may be enticed to move to the idle, second EPS 103 by the chance at a bonus or some other multi-station game result that may be available for the player when the player supplies a prompted player input at the second EPS 103. Whether system 100 is programmed to encourage player movement according to the player's interests, because new gaming machines are available, because a gaming machine has been idle for some time, or for some other reason, system 100 may determine or select a suitable destination or target EPS 103 that may represent the second or subsequent EPS for a multi-station game.

In other embodiments, for various reasons, an LAS 102 of gaming system 100 may track a player's movement throughout a casino by tracking EPSs 103 that the player visits. A player bonus could be related to different movements that the player may make. For example, in a multi-station game, a player bonus may be related to the number of different EPSs 103 that the player has visited. That is, a player could be awarded a bonus or other multi-station game result for playing at a given number of different EPSs 103 in a given period of time. Thus, the player is enticed to move about a casino. A multi-station game may also be used to encourage players to move to different parts of the casino for reasons that may or may not be known to the player. For example, a multi-station game may be used to encourage a player at an EPS 103 at a peripheral area of a casino near an exit to move to a second EPS in a more central area of the casino. Also, a multi-station game according to the invention may be used to prompt a player to move to a second EPS 103 that is located near a performance or some other event in the casino that may be of interest to the player.

In certain embodiments, system 100 may enable a player to identify a particular EPS 103 as a second EPS in a multi-station game by the images on display 109 of the second EPS 103. For example, at a first EPS 103 a player participating in a multi-station game may be prompted to find a second EPS 103 with the display 109 showing a stack of gold bars, a large diamond, or some other readily identifiable graphic. In order to ensure such an EPS 103 is available, system 100, and preferably the multi-station game controller 113 implemented at LAS 102, directs instructions to at least one EPS 103 that is not in use by another player to show the particular identifiable graphic. As discussed above, the second or target EPS 103 may be selected at random or according to a suitable non-random selection rule or procedure. Regardless of how the second EPS 103 is selected, where some readily identifiable graphic is used to identify the second EPS, system 100 ensures that at least one EPS shows the particular identifiable graphic in time for the player to locate such an EPS. In some cases multiple EPSs 103 may be directed to show the described graphic feature in order to make it easier for the player to locate an EPS that may serve as the second EPS in the multi-station game. In other cases, the station changing prompt produced according to the invention may describe some static graphic feature or some characteristic of an EPS 103 that may serve as the second EPS in the multi-station game. That is, the invention need not actually cause a particular identifiable graphic to be displayed at a second EPS 103, but merely identify a graphic or characteristic that is already at the candidate second EPS.

LAS 102 may collect specific player information to assist the system 100 in directing a multi-station game. Player information may be collected in numerous fashions and players may or may not be aware that the information is being collected. In one example, when a player account is set up, players may be surveyed as to whether they would like to participate in multi-station games, and a player may be given the option to choose not to participate. In this case, system 100 would simply not offer multi-station games to players opting not to participate in such games. Players may also be requested to supply personal information indicating the player's level of physical mobility. This information may be used to ensure that system 100 does not offer inappropriate multi-station games to mobility-impaired players.

During a multi-station game, when a player is prompted to move to a particular second EPS 103, the second EPS 103 is preferably monitored by gaming system 100 to account for the situation in which a different player arrives at that particular second EPS 103 to play a game before the player participating in the multi-station game. If a different player arrives at the second EPS 103 before the multi-station game player arrives, the second EPS 103 may allow that different player to begin regular play, either a single-station game or a different multi-station game, at the second EPS 103. While allowing the different player to begin normal play at the EPS 103 which had been selected as the second EPS of the multi-station game, system 100 may select another appropriate EPS as the second EPS of the multi-station game. For example, if the multi-station player was seeking an EPS 103 showing the image of a stack of gold bars and a different player began playing a game at the particular EPS 103 displaying that image, the multi-station game controller 113 would select and direct an alternative EPS 103 to display the gold bar graphic. Depending upon the situation, the alternative second EPS for the multi-station game may be selected and configured transparently to the multi-station player. Alternatively, a multi-station gaming system according to the present invention may prevent a different player from logging on at the particular EPS 103 that has been selected as the second EPS of a multi-station game, and allow only the multi-station player to log on at that EPS. As mentioned above, system 100 may use any suitable arrangement for detecting the identity of a player at an EPS 103, including player-specific login information entered by the player at an EPS and preferably verified through player account data stored in system 100, or scanned image information matched against known images stored in system 100.

Figure 2:
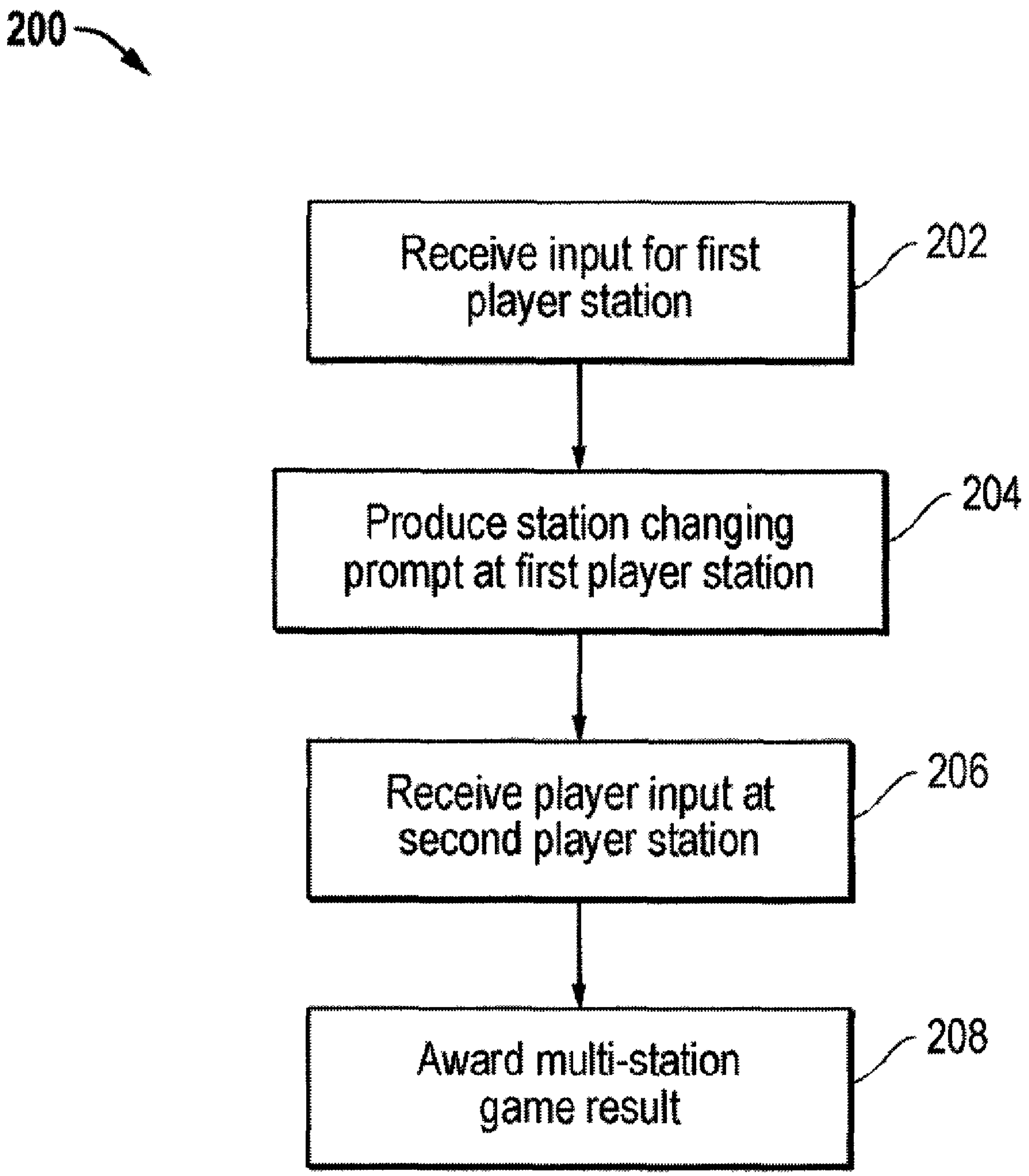
FIG. 2 is a flow diagram illustrating a gaming method embodying principles of the present invention.

FIG. 2 is a flow diagram illustrating a gaming method 200 embodying principles of the present invention. At process block 202, a player input is received for a first player station such as an EPS 103 in FIG. 1. A station changing prompt may then be produced at the first player station as illustrated in process block 204. At process block 206, a player input is received at a second or target player station such as another EPS 103 shown in the gaming system illustrated in FIG. 1, and at process block 208, a multi-station result is awarded.

The input shown at process block 202 may comprise any of a number of different types of inputs within the scope of the invention. For example, the player input may merely comprise a login at one of the EPS 103 shown in FIG. 1. This login may serve to identify the player, and may involve reading a player account card or otherwise receiving an account identifier from the player. Alternatively, the player input indicated at process block 202 may comprise some action related to a game at the EPS 103 such as a play request for either a single station or multi-station game, a wager selection, or any other input. In one preferred form of the invention, the player input shown at block 202 comprises or represents a single-station game selection input which initiates a course of play in a single-station game at the player station. As used in this disclosure and the accompanying claims, a single-station game selection input is an input that represents a player's selection to play a given single-station game available at the first player station. A login, bet, game play request, or any other suitable active or passive input that can be taken as the player's selection to play a single-station game at the first player station may be used as a single-station game selection input according to the invention.

The station changing prompt indicated at process block 204 may comprise any suitable graphic or other presentation at the first player station (such as EPS 103 in FIG. 1) to indicate to the player that they may switch to another player station to participate in a multi-station game. For example, the display 109 of a player station may provide the player with a visual station changing prompt, such as a text or graphic prompt, for the player to move to another player station to complete a multi-station game. Alternatively, the station changing prompt may be an audio prompt or a prompt that is a combination of both audio and visual elements. Regardless of the specific nature of a station changing prompt according to the invention, such a prompt is preferably made in the course of play in a single-station game that has been previously selected for play by the input in block 202. This course of play may include one or more complete game cycles, where a complete game cycle begins at the start of a play and ends with communicating a play result to the player and making any associated award. The period before a game cycle, after a game cycle, and between game cycles for a single-station game is also within the "course of play" as the phrase is used in this disclosure and in the accompanying claims.

It will be noted that the step of producing the station changing prompt as indicated at process block 204 may or may not be performed in response to the player input indicated at process block 202. In some forms of the invention, the multi-station game controller 113 included in gaming system 100 shown in FIG. 1 monitors for certain player inputs at the various EPSs 103 in the system and actually responds to a given player input to cause the respective EPS 103 to produce the station changing prompt. For example, the multi-station game controller 113 may monitor for a certain type of wager input at an EPS 103 and cause the EPS to produce the station changing prompt in response to this type of player input at the EPS. Alternatively, the station changing prompt may be produced in response to some event at an EPS 103 after a player input, such as a particular result in a single station game being played at the EPS for example. In other forms of the invention, the station changing prompt is produced either randomly or at least not in response to any event or action at the respective EPS 103. In some preferred forms of the invention, the station changing prompt may be thought of as interrupting the course of play in a single-station game in the sense that the player has selected a single-station game to play, and the station changing prompt is made at the player station during the course of play in the single-station game without any request on the part of the player to participate in a multi-station game.

Regardless of the format for the station changing prompt, the prompt may cause the player to move to a second or target player station (such as a second EPS 103 in FIG. 1) so that the player may enter the input required at the second player station for the multi-station game. The receipt of this second player input at a second player station is shown at process block 206 in FIG. 2. Similar to the player input at the first player station, many variations exist for the player input at the second player station. For example, the player input may simply be a player login at the second player station, a particular bet at the second player station, or a game play request or some other player action at the second player station. In the embodiment of the invention shown in FIG. 1, the multi-station game controller 113 preferably monitors for this player input at the second EPS 103 of a multi-station game.

Upon receiving the player input at the second player station for the multi-station game, a multi-station result or prize is awarded at process block 208. The multi-station result is preferably awarded at the second player station in some form suitable to the payout or accounting system utilized by the particular gaming system. The result may be a certain value or credit amount, a voucher or coupon providing some value or benefit, an offer for a free play in the gaming system, or a multiplier for a prize available in another game played through the second player station, or some other player station in the gaming system. It will be noted that the particular multi-station result to be awarded may be identified in any number of different fashions and at any point in the process shown in FIG. 2. For example, a given multi-station game result may be dictated by the results of single station games played at the first and second player stations of the multi-station game. Alternatively, a multi-station game result may be selected arbitrarily or at random from a pool of available prizes, or may be a progressive prize. It will also be appreciated that awarding the multi-station game result may be performed immediately at the second player station after the second player input required for the multi-station game, or there may be a significant delay after the second player input. The awarding step may even be performed at some other element in the gaming system other than the second player station. In any event, the multi-station game result is produced or awarded ultimately in response to the required input by the player at the second player station in the multi-station game.

In some embodiments, a timer may be used to measure elapsed time between the display of the station changing prompt at the first player station (such as EPS 103 in FIG. 1) of a multi-station game and the player input at the second or target player station of the multi-station game. The elapsed time may be a factor used in determining a result for the multi-station game. In addition, other factors may contribute to the result in the multi-station game such as another game being played at the second player station, a type or amount of player wager at the first player station, or a type or amount of player wager at the second player station, for example. In other embodiments, the player's result of a game at the second player station may modify a result of a first game played at the first player station of the multi-station game and this modification may represent the multi-station game result.

It will be appreciated that the multi-station gaming process illustrated in FIG. 2 and described above may use a number of different data structures to implement the gaming process. To track data for multi-station games, the multi-station game controller 113 or some other component in system 100 may maintain a multi-station game database in which each database entry maintains information on a single multi-station game. For example, such a multi-station game database may maintain in each respective entry a multi-station game identifier, a status identifier to indicate if the game is in progress or complete, a player identifier, a first player station identifier, each target player station identifier, and information that is necessary to identify a result for the multi-station game. Where target player stations are identified or selected based on status information or other information about the player stations, the multi-station gaming system may also maintain a target player station database from which a target player station may be identified. In forms of the invention in which target player stations are selected based on player specific information, a different target player station database may be associated with each player. Any target player station database may be updated and maintained by monitoring player station status to ensure that a target player station (such as an EPS 103 in FIG. 1) to which a multi-station player may be directed is available for use by the multi-station player. The present invention includes an arrangement for monitoring player station status and this information may be used in populating any player station database or in otherwise selecting an appropriate target player station.

Figure 3:
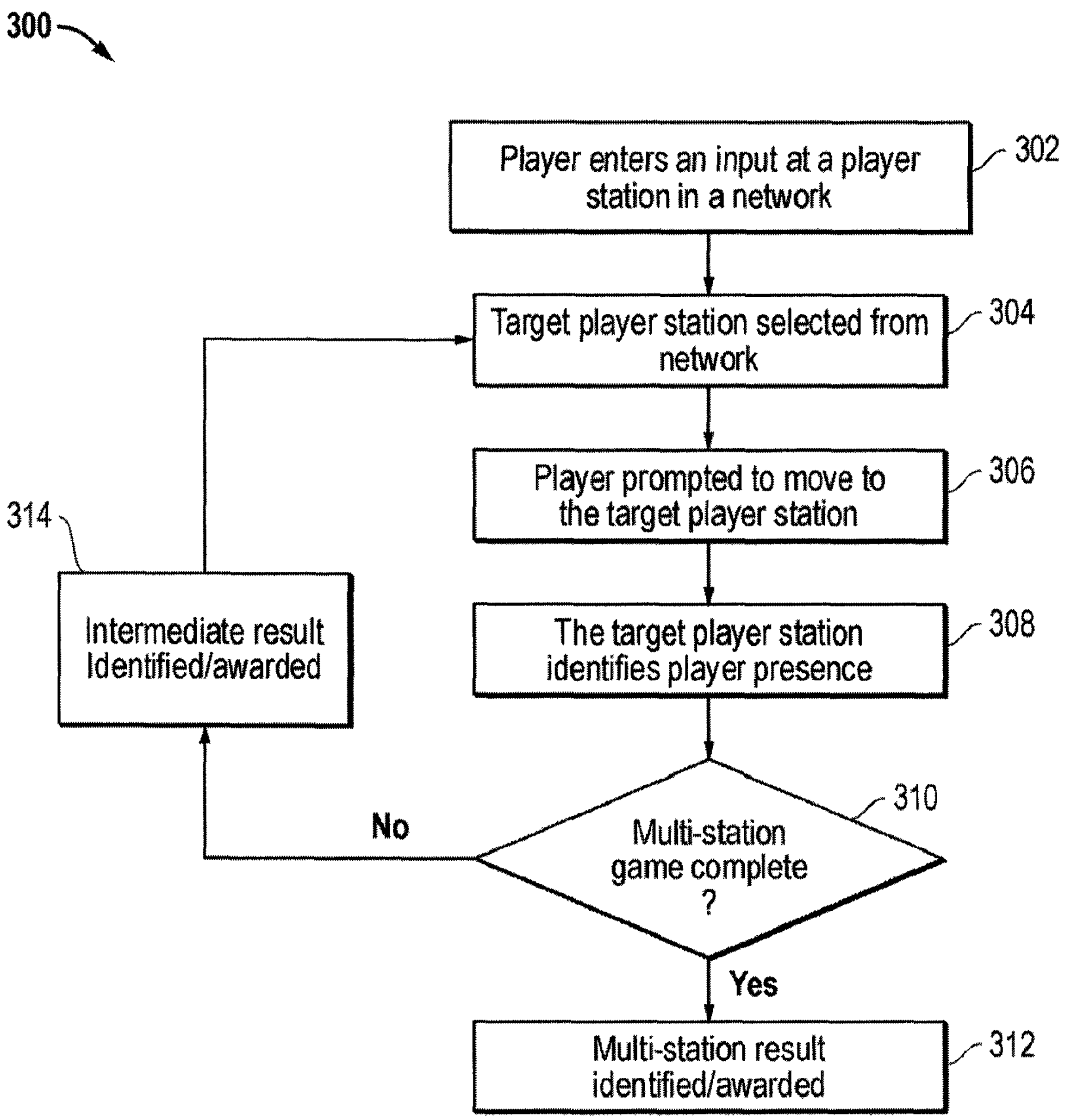
FIG. 3 is a flow diagram illustrating another gaming method embodying principles of the present invention.

FIG. 3 shows the process that may be performed in another embodiment of a multi-station game within the scope of the present invention. In the embodiment shown in FIG. 3, a multi-station game continues or repeats until a player or the system determines that the game has completed. The method 300 begins at process block 302 when a player enters an input, and preferably a single-station game selection input, at a player station (such as a first EPS 103 in FIG. 1) in a network (such the gaming system 100 of FIG. 1). If a multi-station game is invoked in some fashion in response to or after the game play request entered at block 302, a target or next EPS 103 is selected from the network as indicated at block 304. This next EPS 103 represents the next EPS to which a player must move to continue play in the multi-station game. The target EPS selection process at block 304 is preferably performed by the multi-station game controller 113 implemented at LAS 102 in system 100 and may involve any of the selection criteria or information described above.

As indicated at process block 306 in FIG. 3, the player at the first player station is ultimately prompted in some manner to move to the target player station (such as another EPS 103 shown in FIG. 1). In certain situations, a prompt for the multi-station game may appear at the first player station while the player is playing a different game. In the embodiment shown in FIG. 1, the prompt may appear when the multi-station game controller 113 or some other element of system 100 determines that a player is about to move from the first EPS 103 and the prompt offers a bonus prize to the player if the player moves to the specific target EPS 103 in the system 100. At process block 308, the target player station may identify that the player has arrived at that player station. The identification may be accomplished in any suitable fashion, such as by detecting a specific input (player account input, PIN, user name, and/or, password) entered by the player at the target player station that distinguishes the player from other players.

A decision as to whether the multi-station game is complete is made at process block 310. The game is preferably completed by the occurrence of some event at the current player station to which the player was directed at block 306. The multi-station game completion event may be a certain result in a game or some player input at the current player station. In some forms of the invention, the player may be allowed to manually end a multi-station game by entering a game completion input at the second player station. If it is determined that the game is complete, a final result is awarded to the player as indicated at process block 312. In the event that the multi-station game is not complete as indicated by the result in the inquiry shown at decision block 310, a non-final or intermediate result may be awarded to the player as indicated at process block 314 and the process loops back to block 304 where another target player station (such as yet another EPS 103 shown in FIG. 1) is selected from the gaming system. Once the new target player station is selected, the player may be prompted to move to that target player station as indicated at block 306. This cycle repeats until the game is determined to be complete at the decision block 310.

As will be apparent to one of ordinary skill in the art viewing the disclosed embodiments, many further variations are possible within the scope of the appended claims. The above described preferred embodiments are intended to illustrate the principles of the invention, but not to limit the scope of the invention. Various other embodiments and modifications to these preferred embodiments may be made by those skilled in the art without departing from the scope of the invention.

The invention claimed is:

1. A method of administering a game within a gaming network comprising a number of electronic gaming machines, the method including:

(a) initiating a single-station game for a player at a first electronic gaming machine;

(b) in the absence of a request for the player at the first electronic gaming machine to participate in a multi-station game, causing a gaming processor associated with the first electronic gaming machine to display a station changing prompt on an electronic display at the first electronic gaming machine, the station changing prompt presenting the player at the first electronic gaming machine with (i) an option to continue play in the single-station game at the first electronic gaming machine, and (ii) an option to participate in the multi-station game, the multi-station game requiring the player to move to a second electronic gaming machine within the gaming network; and (c) causing the gaming processor to produce a multi-station game result for the player after accepting a player input from the player at an electronic input device at the second gaming machine.

2. The method of claim 1 wherein producing the multi-station game result for the player includes identifying a multiplier to be applied to an additional game result for a game conducted at a respective gaming machine included in a gaming system.

3. The method of claim 1 wherein the station changing prompt identifies the second gaming machine so that the player at the first gaming machine may locate the second gaming machine.

4. The method of claim 3 wherein the station changing prompt describes an identifying display on an electronic display at the second gaming machine, and the method further includes changing a display appearance at the second gaming machine to the identifying display.

5. The method of claim 1 wherein the station changing prompt is produced upon completion of a single-station game cycle at the first gaming machine.

6. The method of claim 1 wherein the station changing prompt is produced after a start of a single-station game cycle and before an end of the single-station game cycle.

7. The method of claim 1 wherein the single-station game is initiated in response to a player login at the first gaming machine.

8. The method of claim 1 further including measuring elapsed time between the display of the station changing prompt at the first gaming machine and the player input at the second gaming machine.

9. A system adapted to administer a game within a gaming network comprising a number of electronic gaming machines, the system including:

(a) a first electronic gaming machine and a second electronic gaming machine within the gaming network; and (b) a multi-station game controller comprising a gaming processor for (i) directing the first electronic gaming machine to display, on an electronic display associated with the first electronic gaming machine, a station changing prompt in a single-station game, the first gaming machine being directed by the gaming processor to display the station changing prompt in the absence of a request by a player at the first gaming machine to participate in a multi-station game, for (ii) monitoring for a prompted player input at the second electronic gaming machine, and for (iii) awarding a multi-station game result after the player makes the prompted player input at the second electronic gaming machine, wherein the station changing prompt presents the player at the first gaming machine with (I) an option to continue play in the single-station game and (II) an option to participate in the multi-station game, the multi-station game requiring the player to move to the second electronic gaming machine.

10. The system of claim 9 wherein the multi-station game controller includes a game conducting controller for conducting the multi-station game requiring player actions at the first gaming machine and the second gaming machine, and an evaluation controller for producing the multi-station game result according to the player actions at the first gaming machine and the second gaming machine.

11. The system of claim 9 wherein the first gaming machine is located at a peripheral area of a casino and the second gaming machine is located at a relatively more central area of the casino as compared to the peripheral area of the casino.

12. The system of claim 9 wherein the multi-station game controller awards the multi-station game result in response to a player login by the player at the second gaming machine.

13. The system of claim 9 wherein the multi-station game controller awards the multi-station game result based on a game result for the player at the second gaming machine.

14. A program product stored on at least one computer readable medium associated with a gaming network comprising a number of electronic gaming machines, the program product including a set of machine-readable instructions that when executed by a gaming processor are configured to:

(a) in the absence of a request by a player at a first electronic gaming machine to participate in a multi-station game, cause a station changing prompt to be displayed at an electronic display at the first electronic gaming machine, the station changing prompt presenting the player at the first electronic gaming machine with (i) an option to continue with a single-station game at the first electronic gaming machine, and (ii) an option to participate in the multi-station game, the multi-station game requiring the player to move to a second electronic gaming machine within the gaming network; and (b) award a multi-station game result for the player after the player makes a player input at the second electronic gaming machine.

15. The program product of claim 14 wherein the machine-readable instructions configured to award the multi-station game result for the player include instructions to measure elapsed time between the display of the station changing prompt at the first gaming machine and the player input at the second gaming machine.

16. The program product of claim 14 wherein the machine-readable instructions configured to cause the station changing prompt to be displayed at the first gaming machine include instructions to identify the second gaming machine based on a relatively more central location of the second gaming machine in a casino as compared to the location of the first gaming machine in the casino.

17. A method including:

(a) receiving a first player input for a player to initiate a single-station game at a first electronic gaming machine in a gaming system, the gaming system comprising a number of electronic gaming machines connected in a network;

(b) in the absence of a request for the player at the first electronic gaming machine to participate in a multi-station game, causing a gaming processor associated with the first electronic gaming machine to display a station changing prompt on an electronic display at the first electronic gaming machine, the station changing prompt giving the player at the first electronic gaming machine (i) an option of moving from the first electronic gaming machine to a second electronic gaming machine in the gaming system to participate in the multi-station game, and (ii) an option of continuing play of the single-station game without participating in any multi-station game;

(c) receiving an input from the player via an electronic input device at the first gaming machine indicating that the player selects the option of moving from the first gaming machine to the second gaming machine to participate in the multi-station game; and (d) where the player selects the option of moving from the first gaming machine to the second gaming machine to participate in the multi-station game, providing the player with a multi-station game award.

18. The method of claim 17 wherein the station changing prompt identifies the second gaming machine by a graphic feature to be displayed on an electronic display at the second gaming machine, and the method further includes modifying a display at the second gaming machine to produce the graphic feature.

19. The method of claim 17 further including selecting the second gaming machine based on the position of the second gaming machine at a relatively more central location of a casino as compared to the location of the first gaming machine in the casino.

20. The method of claim 17 further including measuring elapsed time between the display of the station changing prompt at the first gaming machine and a player input at the second gaming machine.

* * * * *